3,726,739
METHODS OF CEMENTING SOLID MATERIALS
Horst Dalibor, Harksheide, Gunter Stenzel, Hamburg, and Richard Gutte, Oststeinbek, Germany, assignors to Reichhold-Albert Chemie Aktiengesellschaft
Filed Dec. 7, 1970, Ser. No. 95,797
Claims priority, application Switzerland, Dec. 8, 1969, 18,227/69; Mar. 4, 1970, 6,625/70
Int. Cl. C09j 5/02
U.S. Cl. 156—308                                 8 Claims

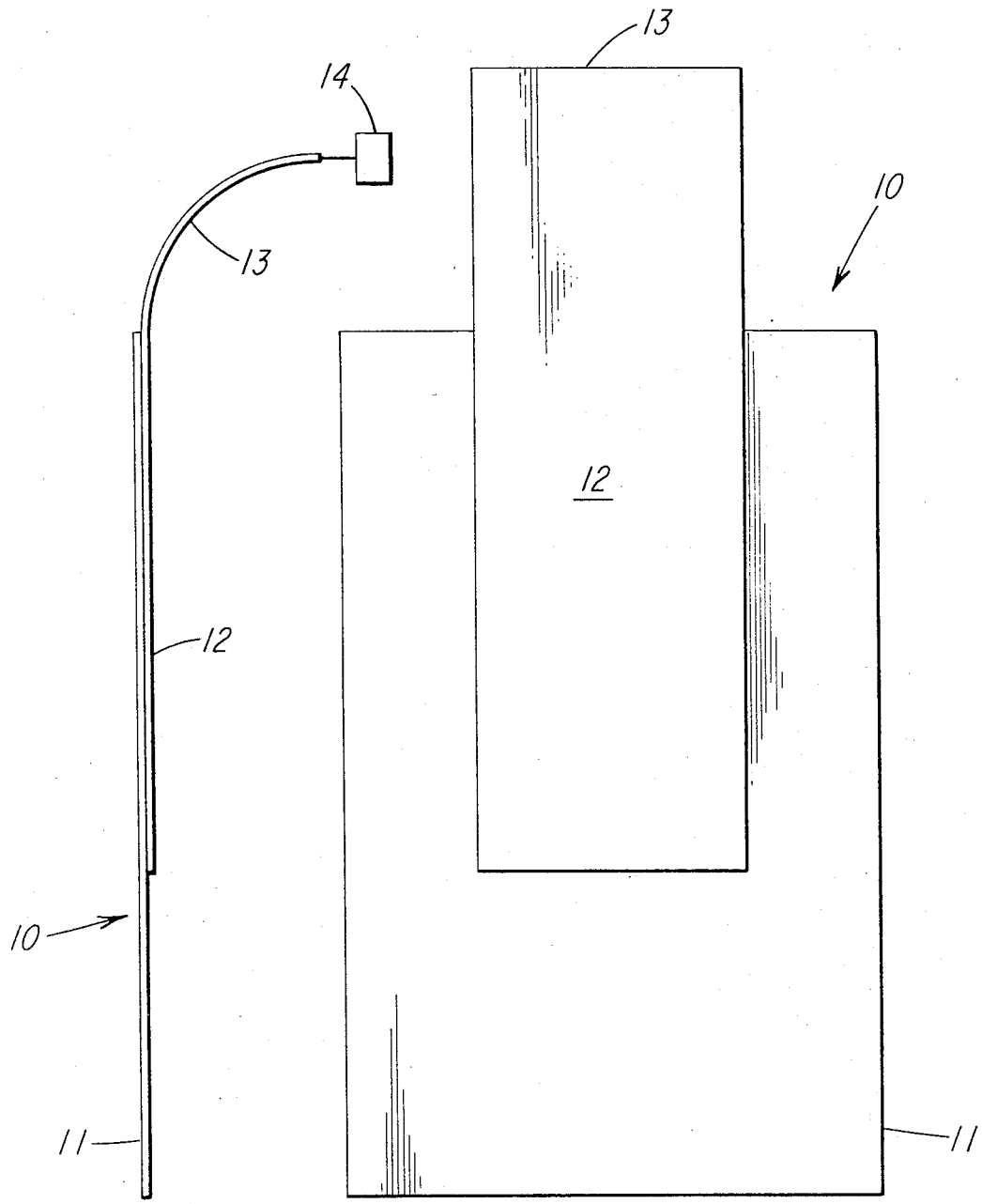

ABSTRACT OF THE DISCLOSURE

This invention relates to a method of cementing solid materials by applying molten thermoplastics as fusion contact adhesives and allowing the molten thermoplastics to cool in contact with at least one of the materials to be cemented, in the usual way, characterized in that copolymers consisting of (a) a nitrile of an $\alpha,\beta$-ethylenically unsaturated mono- or dicarboxylic acid or a mixture of more than one such nitrile,
(b) an amide of an $\alpha,\beta$-ethylenically unsaturated mono- or dicarboxylic acid or a mixture of more than one such amide,
(c) an ester of an $\alpha,\beta$-ethylenically unsaturated mono- or dicarboxylic acid, containing 4 to 12 carbon atoms in the alcohol residue, of a mixture or more than one such ester, and
(d) methyl methacrylate are used as fusion contact adhesives. The preferred embodiment of the invention is characterized in that a product of a reaction between the copolymer and 0.01 to 1.0% by weight of formaldehyde or formaldehyde-releasing agents is used as a fusion contact adhesive.

BACKGROUND OF THE INVENTION

German patent publications 1,569,908 and 1,569,909 describe fusion adhesives based on styrene and acrylic- or methacrylic acid esters and in some cases copolymerizable monomers with polar hydrophilic groups. Without the polar hydrophilic groups in the monomers these fusion adhesives have good heat stability at 180° C. to 200° C. but the shear and peel strengths when the thus made joint is subjected to stress are too small and also the cold flow at room temperature is so great that adhesion faults occur. Fusion adhesives which also contain polar hydrophilic groups in the copolymerizable monomers are also described. These fusion adhesives show good shear and peel strengths when the joint is stressed, but the heat stability of the molten fusion adhesive at 180° C. to 200° C. in the presence of atmospheric oxygen amounts to only 1 to 4 hours. Such products are therefore not suitable for commercial exploitation. To make the products commercially exploitable, on the other hand, efforts are made to obtain a heat stability of 24 hours at 180° C. to 200° C., and the viscosity must remain constant or rise only slightly.

The present invention is based on the problem of making available a method of cementing solid materials which does not have the aforesaid disadvantages or has then only to a very much smaller extent and, more particularly, provides improved shear and peel strengths of the cemented joint.

SUMMARY OF THE INVENTION

It has been found that solid materials can be advantageously cemented by applying molten thermoplastics as adhesives and leaving the molten thermoplastics to cool in contact with at least one of the materials to be cemented, in the usual way, if copolymers consisting of (a) 1 to 20% by weight of a nitrile on an $\alpha,\beta$-ethylenically unsaturated mono- or dicarboxylic acid or a mixture of more than one such nitrile,
(b) 1 to 20% by weight of an amide of $\alpha,\beta$-ethylenically unsaturated mono- or dicarboxylic acid or a mixture of more than one such amide,
(c) 40 to 97% by weight of an ester of an $\alpha,\beta$-ethylenically unsaturated mono- or dicarboxylic acid, containing 4 to 12 carbon atoms in the alcohol residue, or a mixture of more than one such ester, and
(d) 1 to 30% by weight of methyl methacrylate are used as fusion contact adhesives.

Summary of the preferred embodiment of the invention

In the preferred embodiment of the method a product of a reaction between the copolymer already mentioned above and synthesized from components (a) to (d), together with formaldehyde and/or formaldehyde-releasing agents, is used.

In regard to the synthesis components the following is to be stated:

(a) The nitrile of an $\alpha,\beta$-ethylenically unsaturated mono- or dicarboxylic acid, or mixture of such nitriles, may comprise: acrylonitrile, methacrylonitrile, maleic dinitrile or fumaric dinitrile or mononitriles of maleic acid or fumaric acid monoesters, when the alcohol residue in the monoester amounts to $C_1$ to $C_{18}$ carbon atoms.

(b) The amide of an $\alpha,\beta$-ethylenically unsaturated mono- or dicarboxylic acid, or mixture of such amides, may comprise: acrylamide, methacrylamide, maleic acid diamide or fumaric acid diamide or monoamides of maleic acid or fumaric acid monoesters, when the alcohol residue in the monoester amounts to $C_1$ to $C_{18}$ carbon atoms.

(c) The ester of an $\alpha,\beta$-ethylenically unsaturated mono- or dicarboxylic acid, or mixture of such esters, may comprise: n-butylacrylate, n-hexyl acrylate, 2-ethyl hexylacrylate, n-decyl acrylate and n-dodecylacrylate or n-butyl methacrylate, n-hexyl methacrylate, 2-ethyl hexylmethacrylate, n-decylmethacrylate and n-dodecylmethacrylate. N-butyl acrylate and 2-ethyl hexylacrylate are found to be particularly advantageous.

PREFERRED EMBODIMENT OF THE INVENTION

The copolymers used in the invention are obtained by copolymerization of the $\alpha,\beta$-ethylenically unsaturated compounds in accordance with ordinary methods of manufacture, such as solvent polymerization or bulk or graft polymerization in the presence of polymerization initiators and with the use of chain regulators also if required. The most succesful results are obtained if the copolymerization is carried out in the presence of solvents, and the solvents, xylene or butanol for example, are then removed by distillation. Suitable polymerization initiators are peroxides such as benzoyl peroxide, di-tertiary butyl peroxide, lauryl peroxide or cumene hydroperoxide.

The copolymers should have a viscosity of 50 to 1000 and preferably 100 to 600 DIN 6 seconds when measured as a 50% by weight xylene solution at 20° C.

In the most preferred embodiment the fusion contact adhesives used in the invention are products of a reaction of the copolymers with formaldehyde or formaldehyde-surrendering compounds (formaldehyde-releasing agents).

Suitable formaldehyde-surrendering compounds (formaldehyde-releasing agents) are paraformaldehyde, hexamethylene tetramine, trioxane, and gaseous formaldehyde dissolved in any one of many different media.

The various media may be for instance plasticizers, vegetable or mineral oils, synthetic resins or natural rosins.

It is also possible to use formaldehyde-releasing aminoplasts or phenol-formaldehyde resoles.

Further possibilities are organic compounds or synthetic resins containing methylol ether groups that are masked or have been etherified with alcohols.

In the preferred form, for making the fusion contact adhesive the copolymers containing amide groups that are used in the invention are well dissolved or dispersed together with formaldehyde or formaldehyde-releasing substances in a suitable stirring unit such as a kneader or mixer, at room temperature or higher temperatures up to 200° C.

The best mixing effect is obtained if paraformaldehyde is added at 100° C. to 120° C. while the material is being stirred, and the mixture is then heated to 180° C. or even higher temperatures up to 220° C. in a time not exceeding one hour. This causes an increase in the viscosity, but storability for a time of about 12 to 48 hours at 180° C. to 220° C. is ensured by suitable selection of the quantity of formaldehyde or the amount of formaldehyde-releasing agents that is added. When the initial viscosity of the copolymer is higher, for instance about 500 to 1000 DIN 6 seconds when measured as a 50% by weight xylene solution at 20° C., the quantity of paraformaldehyde added will be made smaller, for instance 0.01 to 0.08% by weight. It is best if the amount added is between 0.01 and 0.04% by weight.

If the copolymers have lower viscosities, for instance 50 to 500 DIN 6 seconds when measured as a 50% by weight xylene solution at 20° C., the proportion of paraformaldehyde will amount to between 0.03 and 0.2% by weight. In this case it is best if the amount added is from 0.04 to 0.1% by weight.

If hexamethylenetetramine is used instead of paraformaldehyde, the substance is introduced in the same way as when paraformaldehyde is used. If the initial viscosity of the copolymers amounts for instance to between 500 and 1000 DIN 6 seconds when measured as a 50% by weight xylene solution at 20° C., then when hexamethylenetetramine is employed a quantity amounting to between 0.02 and 0.2% by weight, preferably 0.03 to 0.1% by weight, can be used.

If the copolymers have lower viscosities, for instance 50 to 500 DIN 6 seconds when measured as a 50% by weight xylene solution at 20° C., then preferably 0.06 to 0.5% by weight is used when hexamethylenetetramine is employed.

It is also possible to obtain satisfactory results by using trioxane, and gaseous formaldehyde dissolved or dispersed in any one of many different media such as water, solvents, plasticizers, vegetable or mineral oils or synthetic or natural rosins. But parafromaldehyde and hexamethylenetetramine are preferably used.

The fusion contact adhesives used according to the invention have a high heat stability, so that at the relevant working temperatures of about 200° C. they can be worked during a period of 12 to 48 hours without great changes in viscosity. The fusion contact adhesives also have an advantageous dependency of their viscosity on temperature, that is to say, as the temperature rises their viscosity decreases so rapidly that the liquid melts can be satisfactorily worked and do not become ropy. In the most preferred embodiment the reaction of formaldehyde-surrendering substances with the copolymers containing amide groups gives rise to a condensation which slightly increases the viscosity but at temperatures up to 200° C. still produces liquid and meltable fusion contact adhesives which when applied to any one of many different materials provide good adhesion and very good cohesion at room temperature and also at temperatures from 50 to 100° C.

When applied to the materials to be cemented, the fusion contact adhesives used in accordance with the invention produce firmly adherent films which may be sticky or not sticky at room temperature.

Films which are capable of cementing at room temperature are referred to as self-adhesive fusion contact adhesives.

Fusion contact adhesives which do not produce sufficient surface stickiness of the films at room temperature must be activated by an increase in temperature.

The most preferred embodiment is the film with good surface stickiness which cements even at room temperature.

The fusion contact adhesives of the invention have a good power of adhesion to ordinary materials such as wood, leather, paper, metal, glass, lacquered metal surface, textiles and plastics sheets. The addition of ester plasticizers has an advantageous effect for cementing operations at temperatures of 0 to +10° C. The incorporation of customary fillers and extenders such as barium sulphate, chalk and quartz powder in quantities up to 50% by weight does not have any effect in reducing the strength of the cemented joint.

The materials to be cemented are the materials commonly met with in practice, such as plastics, leather, paper, cardboard, textiles, metals, glass and wood. For cementing, the fusion contact adhesives are applied in a molten state in a thin layer to the materials and subsequently cemented to the other material, in accordance with the usual way of using fusion contact adhesive. For this purpose the copolymers can be used as fusion contact adhesives either alone or mixed with other styrene and acrylic ester or methacrylic ester copolymers. It is also possible to mix them with the usual admixtures, fillers and pigments such as chalk, carbon black, barium sulphate, kaolin, zinc oxide or calcium oxide, with resins such as balsamic resins, rosin esters, ketone resins, phenol resins or terpene resins or for instance with waxes such as montan waxes and to use melts of the mixture for cementing.

The fusion contact adhesives of the invention may be processed in the machines ordinarily used for fusion adhesives, for instance by application through a heated nozzle (hot-pouring machine) or by way of heated rollers. In this procedure it is also possible to apply the molten fusion contact adhesive in a first process step and allow the melt to solidify and then subsequently carry out cementing at room temperature. Fusion contact adhesives which have an excessively small surface stickiness, for instance "Tack" 2 to 6 (the meaning of the expression "Tack" will be explained later on), can be used for cementing by thermal activation, for instance in a high-frequency field, of the adhesive layer that has been produced and hot pressing.

These copolymers that are used in accordance with the invention are distinguished from the known fusion contact adhesives by a surprisingly high heat stability so that they can be kept in a molten state throughout the whole of a working day without noticeable change. They are insensitive to local overheating. They can be processed by high-frequency cementing. They also have an advantageous dependency of their viscosity on temperature, so that the liquid melts can be worked satisfactorily.

In the preferred embodiment the fusion contact adhesive is applied while hot to an adhesive carrier which is to be cemented. The cementing operation is subsequently carried out in the cold state; in this operation the object to be cemented is brought into contact with the adhesive layer, whereupon cementing takes place.

There are following favored fields of application of the fusion contact adhesives of this invention: the coating of the bottom of self-adhesive floor coverings, of self-adhesive vibration absorber coverings and also of masking tapes and of decoration foils.

The self-adhesive fusion contact adhesive used in accordance with the invention is applied in the first step upon the materials in the molten state. Afterwards the adherend is covered by a separating foil or, if masking tapes are used, by the water-proof bottom foil until cementation is being carried through.

In a second step of the procedure the cementing will be done at a later moment by removing the separating foil and pressing the coated surface having the fusion contact adhesive on it upon the material to be cemented.

The adhesion takes place at room temperature without having to activate the fusion adhesive film.

A notation from "Tack" 1 to "Tack" 10 has been selected for evaluation of surface stickiness.

Tack 1—does not stick at room temperature
Tack 2 to 6—insufficient surface stickiness at room temperature
Tack 7—sufficient surface stickiness at room temperature
Tack 8—satisfactory surface stickiness at room temperature
Tack 9—good surface stickiness at room temperature
Tack 10—very good surface stickiness at room temperature.

The melt viscosities were determined in the Epprecht-Rheomat 15 viscosimeter.

The shear strength was determined in accordance with DIN (German Industrial Standard) 53273; the material used was a polyester sheet based on terephthalic acid (Kalle Hostafan sheet), which was 5 cm. wide and 0.1 mm. thick. The overlap amounted to 5 mm. The separating strength was determined in accordance with DIN 53274; in this case also, polyester sheet based on terephthalic acid (Hostafan sheet) was used, which was 0.1 mm. thick and 5 cm. wide.

The molten adhesive was applied upon the sheet by an applicator in a thickness of film of 150μ, while the sheet was being cooled from the bottom. After cooling of the adhesive layer the cementing was carried through.

The heat resistance was determined as follows:

Bituminous felt containing 50% by weight of bitumen was coated with the fusion adhesive while hot. The coated side of a strip of this felt which was 5 cm. wide and 15 cm. long was cemented at room temperature to a metal plate, so that a cemented surface area of 50 cm.$^2$ was obtained. After having been stored for 24 hours at room temperature the cemented joint was tempered at 70° C. for 5 minutes, and a 50 g. weight of which the force acted at 90 degrees to the joint was used to determine the time in which the cemented strip was separated from the metal plate at 70° C. (see drawing).

In the drawing:

FIG. 1 shows a bottom view of a test device for the determination of heat resistance, and FIG. 2 shows a side elevation of the test device with a test weight attached.

Test device 10 shown in FIGS. 1 and 2 comprises metal plate 11 to which is affixed a portion of bituminous felt strip 12 by means of the fusion adhesive to be tested. Weight 14 is attached to free end 13 of strip 12 as shown in FIG. 2.

EXAMPLE 1

A copolymer of 77.0 parts by weight of 2-ethyl hexylacrylate, 14.6 parts by weight of methyl methacrylate, 5.4 parts by weight of acrylonitrile and 3.1 parts by weight of acrylamide, with a viscosity of 250 DIN 6 seconds when measured as a 50% by weight xylene solution at 20° C., was used as a fusion contact adhesive.

The determination of shear- and separating strength took place as described above by means of a 0.1 mm. polyester sheet which was covered with an adhesive film of the thickness of 150μ.

Shear strength: 4 kp./cm.$^2$
Separating strength: 0.9 kp./cm.
Heat resistance: 8 minutes
Heat test: Viscosity measured at 20° C.
Fusion contact adhesive after storage for 24 hours at 180° C.: 300 DIN 6 seconds when measured as a 50% by weight solution in xylene
Fusion contact adhesive that had been exposed to room temperature only: 250 DIN 6 seconds when measured as a 50% by weight xylene solution.

VISCOUS FLOW BEHAVIOR IN DEPENDENCY ON TEMPERATURE

| Temperature, °C. | Centipoises | |
|---|---|---|
| | Initial viscosity | Viscosity after storage for 48 hours at 180° C. |
| 200 | 3,000 | 4,600 |
| 180 | 4,100 | 7,000 |
| 160 | 9,100 | 12,400 |
| 140 | 16,500 | 21,500 |
| 120 | 54,200 | 70,700 |

The fusion contact adhesive did in fact show a rise in viscosity after having been stored for 48 hours at 180° C., but the product could still be worked very satisfactorily.

99.5 parts by weight of copolymer 1 were mixed with 0.5 part by weight of a customary antioxidant based on phenol at 180° C.

The obtained fusion contact adhesive was applied in the molten state by an applicator to the bottom of a textile floor covering in a thickness of film of 200 to 300μ at about 180° C.

Silicone paper was put upon the still warm fusion contact adhesive layer for covering.

The silicone paper was taken off at the place of consumption at room temperature. After that the floor covering coated with fusion contact adhesive was being pressed by hand against a concrete floor. The cementing is then finished.

The strength of the cementing corresponds with the above described test results.

EXAMPLE 2

100 parts by weight of a copolymer 1 according to Example 1, to which 0.04 part by weight of paraformaldehyde has been added, are used as a fusion contact adhesive.

This added material was introduced into the copolymer while it was being stirred at 100 to 120° C., and the material was heated at 160° C. to 180° C. for another 30 to 60 minutes.

Shear strength: 6.5 kp./cm.$^2$
Separating strength: 1.5 kp./cm.
Heat resistance: 14 minutes.
Heat test: Viscosity measured at 200° C.
Fusion contact adhesive which had been heated to 180° C. for only a short time: 5100 cp.
Fusion contact adhesive after storage for 48 hours at 180° C.: 7200 cp.

VISCOUS FLOW BEHAVIOR IN DEPENDENCY ON TEMPERATURE

| Temperature, °C. | Centipoises | |
|---|---|---|
| | Initial viscosity | Viscosity after storage for 48 hours at 180° C. |
| 200 | 5,000 | 7,200 |
| 180 | 7,400 | 12,100 |
| 160 | 16,000 | 22,200 |
| 140 | 35,000 | 45,500 |
| 120 | 102,000 | 133,000 |

The fusion contact adhesive did in fact show a rise in viscosity after having been stored for 48 hours at 180° C., but this product could still be worked very satisfactorily. Surface stickiness at 20° C.: "Tack" 9.

99.5 parts by weight of fusion adhesive according to Example 2 and 0.5 part by weight of the customary antioxidant based on phenol were mixed at a temperature of about 180° C. The obtained fusion contact adhesive was applied in the molten state at 180° C. by an applicator in a layer 200μ thick to a bituminous felt containing 50% by weight of bitumen. Silicone paper was put on the still warm layer of fusion contact adhesive for covering.

At the place of consumption the silicone paper was being pulled off at room temperature (20° C.). The the bituminous felt covered with fusion contact adhesive was cemented by hand in the inside of a car door made of body sheets that had been coated with a primer in the usual manner.

The cementing is then finished.

The strength of the cementing corresponds with the above mentioned tests results.

EXAMPLE 3

100 parts by weight of a copolymer 1 according to Example 1, to which 0.08 part by weight of hexamethylenetetramine has been added, are used as a fusion contact adhesive. This added material was introduced into the copolymer while it was being stirred at 100 to 120° C., and the material was heated at 160° C. to 180° C. for another 30 to 60 minutes.

Shear strength: 7 kp./cm.$^2$
Separating strength: 1.2 kp./cm.
Heat resistance at 70° C.: 30 minutes
Surface stickiness at 20° C.: "Tack" 8–9

VISCOUS FLOW BEHAVIOR IN DEPENDENCY ON TEMPERATURE

| Temperature, °C. | Centipoises | |
|---|---|---|
| | Initial viscosity | Viscosity after storage for 48 hours at 180° C. |
| 200 | 12,000 | 17,800 |
| 180 | 16,900 | 22,500 |
| 160 | 29,600 | 35,500 |
| 140 | 66,900 | 78,000 |
| 120 | 138,000 | 160,000 |

Heat test: Viscosity measured at 200° C.
Fusion contact adhesive after storage for 48 hours at 180° C.: 17500 cp.
Fusion contact adhesive which had been heated to 180° C. for only a short time: 12000 cp.

The fusion contact adhesive did in fact show a rise in viscosity after having been stored for 48 hours at 180° C., but this product could still be worked very satisfactorily.

99.5 parts by weight of fusion contact adhesive according to Example 3 and 0.5 part by weight of customary antioxidant based on phenol were mixed at a temperature of about 180° C. The obtained fusion contact adhesive was applied in the molten state at 180° C. by an applicator in a layer 80μ thick to a strong soda paper plain on both sides. The strong soda paper has been coated in the usual manner on the side free of fusion contact adhesive with an antiadhesive layer made on the basis of silicone resin. Afterwards the covered strong soda paper was rolled up on a reel. At the place of consumption the reel was uncoiled at room temperature (20° C.), and the tape having the fusion contact adhesive layer was pressed by hand against the surface that had to be covered up.

The cementing is then finished.

The strength of the cementing corresponds with the above mentioned test results.

It has now been found further on that a practicable method of cementing solid materials by applying molten thermoplastics as fusion contact adhesives and allowing the molten thermoplastics to cool in contact with a material to be cemented is arrived at if a modification of the method is carried out which is characterized in that the formaldehyde-releasing compound or formaldehyde respectively and the copolymer are applied together or successively to a material to be cemented, and the fusion contact adhesive is formed, as a product of a reaction between the copolymer and the formaldehyde-releasing compound or formaldehyde-respectively by keeping the material at the melting temperature of the copolymer and/ or by heating, before the cementing operation at the latest.

The modification of the method characterized as described above can be carried into effect by a process in which a material to be cemented is first coated, impregnated or pre-treated with a formaldehyde-releasing compound or formaldehyde respectively by spraying, powdering or vapor deposition or in some other suitable way, and subsequently the copolymer is applied in a molten state, or alternatively the copolymer is first applied and subsequently the applied copolymer is provided with a formaldehyde-releasing compound. It is also possible to apply the copolymer and the formaldehyde-releasing compound or formaldehyde respectively together or alternately to at least one of the surfaces to be cemented.

In a partciular embodiment of the method the formaldehyde-releasing compound or formaldehyde respectively can also be applied as an intermediate layer, in which case the base layer previously laid on the carrier material may consist either of the copolymer to be cross-linked or else of any other suitable and compatible binding agent. The covering layer consists in each case of the copolymer which is to be made to react with the formaldehyde-releasing compound or formaldehyde respectively in order to form the fusion contact adhesive.

This modified manner of operation has the great advantage that the copolymer when applied is not yet chemically combined with the formaldehyde-releasing compound or formaldehyde respectively so that the conventional applying apparatus with the hitherto used nozzles, rollers and other applying devices can be employed, since the viscosity of the copolymer at its melting temperature is relatively low as compared with that of the fusion contact adhesive formed by reaction of the copolymer with the formaldehyde-releasing compound or formaldehyde respectively. A further advantage is that the reaction of the copolymer with the formaldehyde-releasing compound or formaldehyde respectively to form the fusion contact adhesive can be effected in an extremely short time, because the formaldehyde-releasing compound or formaldehyde respectively can now be used in such large quantities as to ensure that for instance 0.01 to 1.0% by weight of the formaldehyde-releasing compound or formaldehyde respectively really does enter into the reaction with the copolymer that is used. The excess formaldehyde-releasing compound or formaldehyde respectively that has not entered into the reaction evaporates or gasifies and can easily be removed by suitable suction devices so that the cemented joint or the fusion contact adhesives in the cemented state is practically free from contamination by superfluous formaldehyde-releasing compounds or formaldehyde-respectively that are not chemically combined with it. This modification enables even fusion contact adhesives which are such that they have a substantially higher viscosity and can be applied only with difficulty, or cannot be applied at all, by means of the usual applying apparatus, to be produced after application of the material to the surface to be cemented.

The modified method will be made clear by the following examples:

EXAMPLE 4

A fusion contact adhesive as in Example 1 is applied to a carrier material, for instance bituminous felt, and after application is uniformly coated by powdering with pulverulent paraformaldehyde. Then the sprinkled surface is blown with compressed air to remove excess paraformaldehyde so that about 4% by weight of formaldehyde, with respect to the weight of the applied copolymer, is left on the surface. A reaction is then produced by heating to between 140 and 180° C. (preferably 180° C.) for a period of about 5 minutes. The reaction product obtained is a fusion contact adhesive layer having a substantially higher heat resistance and shear strength in the cemented joint than the initial copolymer, whereby 0.95% by weight of formaldehyde were made to react.

The fusion contact adhesive side of the bituminous felt coated on one side with the fusion contact adhesive is covered with a pull-off sheet, for instance suitably impregnated paper or suitable plastics sheet. The ultimate user removes the cover located on the fusion contact adhesive side and brings the part to be cemented, for instance sheet metal forming part of automobile coachwork, into contact with the fusion contact adhesive side and presses the bituminous felt against the metal whereupon the felt adheres firmly to the metal.

EXAMPLE 5

The carrier material, for instance bituminous felt, is sprinkled with paraformaldehyde in the way described in Example 4 and then the copolymer of Example 1 is applied by spreading, rolling or pouring at a temperature of about 180° C. A reaction with the paraformaldehyde sprinkled on as the base layer is then produced by keeping the melting temperature at about 180° C. for a period of 5 minutes and/or by subsequent heating to a temperature of 140 to 180° C. (preferably 180° C.) for 5 minutes. The resulting fusion contact adhesive has a substantially higher heat resistance and shear strength than the initial copolymer. It contains about 0.84% by weight of chemically bound formaldehyde. The rest of the processing can be carried out as described in Example 4.

EXAMPLE 6

The carrier material, for instance bituminous felt, is provided with a base layer consisting of a copolymer of vinyl acetate and fumaric acid butyl ester and paraformaldehyde is sprinkled on this base layer. The sprinkled surface is blown with compressed air so that about 4% by weight of paraformaldehyde, with respect to the weight of the applied fusion adhesive copolymer, remains on the surface.

The fusion adhesive copolymer 1 as described in Example 1 is then applied at 180° C. in a layer about 200$\mu$ thick and the reaction with the paraformaldehyde that has already been previously applied is carried out for 5 minutes at 180° C., whereby 0.75% by weight of formaldehyde are made to react. The result is a substantial increase in the heat resistance and shear strength in the subsequent cemented joint. Processing as described in Example 4 can be carried out.

EXAMPLE 7

The carrier material, for instance bituminous felt, is provided with a base layer consisting of a copolymer of vinyl acetate and 2-ethyl hexylacrylate.

A solution of 8% by weight of hexamethylenetetramine in chloroform is sprayed onto this base layer so as to form a thin layer and after this has dried the fusion adhesive copolymer 1 according to Example 1 is applied in a layer 200$\mu$ thick at a temperature of 180° C. The reaction with hexamethylenetramine as a formaldehyde-releasing agent is then carried out for 5 minutes at 180° C., whereby 0.65% by weight of formaldehyde are bound chemically.

It was found that in cemented joints the heat resistance was increased sixfold, from 5 minutes to 30 minutes. The heat resistance was determined by the test described above. Further processing as described in Example 4 can be carried out.

We claim:

1. A method of cementing solid materials at room temperature by applying molten thermoplastics as fusion contact adhesives to said materials and allowing the molten thermoplastics to cool to room temperature in contact with at least one of the materials to be cemented and then joining said materials at room temperature by pressing the material coated with the fusion contact adhesive into contact with the material to be bonded thereto, characterized in that copolymers consisting of
    (a) 1 to 20% by weight of a nitrile of an $\alpha,\beta$-ethylenically unsaturated mono- or dicarboxylic acid or a mixture of more than one such nitrile,
    (b) 1 to 20% by weight of an amide of an $\alpha,\beta$-ethylenically unsaturated mono- or dicarboxylic acid or a mixture of more than one such amide,
    (c) 40 to 97% by weight of an ester of an $\alpha,\beta$-ethylenically mono- or dicarboxylic acid, containing 4 to 12 carbon atoms in the alcohol residue, or a mixture of more than one such ester, and
    (d) 1 to 30% by weight of methyl methacrylate are used as fusion contact adhesives.

2. A method according to claim 1, characterized in that a product of a reaction between the copolymer and 0.01 to 1.0% by weight of formaldehyde or formaldehyde-releasing agents is used as a fusion contact adhesive.

3. A method according to claim 2 which comprises applying the copolymer and a formaldehyde releasing compound to at least one of said materials and reacting the molten copolymer with the formaldehyde releasing compound before cooling to room temperature.

4. A method according to claim 3 which comprises first applying a formaldehyde releasing compound to at least one of said materials and subsequently applying said molten copolymer to said formaldehyde releasing compound.

5. A method according to claim 3 which comprises first applying the copolymer to at least one of said materials and subsequently applying a formaldehyde releasing compound to said copolymer.

6. A method according to claim 3 which comprises depositing a layer of the copolymer or a binding agent compatible therewith on the material to be cemented so as to form a base layer, applying the formaldehyde releasing compound on the base layer so as to produce an intermediate layer, applying the copolymer to the intermediate layer so as to form a covering layer, and then reacting the copolymer of the covering layer with the formaldehyde releasing compound of the intermediate layer.

7. A method according to claim 1, characterized in that copolymers consisting of
    (a) 1 to 20% by weight of acrylonitrile, methacrylonitrile, maleic dinitrile, fumaric dinitrile, mononitriles of maleic acid monoesters, or mononitriles of fumaric acid monoesters, or a mixture of more than one such nitrile,
    (b) 1 to 20% by weight of acrylamide, methacrylamide, maleic acid diamide, fumaric acid diamide, monoamides of maleic acid monoesters, or monoamides of fumaric acid monoesters, or a mixture of more than one such amide,
    (c) 40 to 97% by weight of n-butylacrylate, n-hexylacrylate, 2-ethylhexylacrylate, n-decylacrylate, n-dodecylacrylate, n-butylmethacrylate, n-hexylmethacrylate, 2-ethylhexylmethacrylate, n-decylmethacrylate, or n-dodecylmethacrylate, or a mixture of more than one such ester, and
    (d) 1 to 30% by weight of methyl methacrylate are used as fusion contact adhesives.

8. A method according to claim 1 characterized in that a copolymer consisting of 5.4% by weight of acrylonitrile, 3.1% by weight of acrylamide, 77% by weight of 2-ethylhexylacrylate, and 14.6% by weight of methylmethacrylate is used as fusion contact adhesive.

References Cited

UNITED STATES PATENTS

| | | | |
|---|---|---|---|
| 2,718,515 | 9/1955 | Thomas | 260—80.73 X |
| 3,567,486 | 3/1971 | Remmington et al. | 117—122 |
| 3,585,063 | 6/1971 | Remmington | 117—161 |
| 3,037,963 | 6/1962 | Christenson | 260—80.73 X |
| 3,539,440 | 11/1970 | Gerek et al. | 117—122 |
| 3,558,574 | 1/1971 | Doehnert | 117—122 |

MURRAY KATZ, Primary Examiner

B. D. PIANALTO, Assistant Examiner

U.S. Cl. X.R.

117—28, 30, 62.1, 68.5, 76 A, 161 UT; 156—331, 332, 335; 161—406; 260—80.73